3,371,018
STARCH CONVERSION
Foster G. Ewing, John L. Bidrawn, Benjamin H. Landis, and Harold R. Wheeler, Jr., Clinton, Iowa, and Marcus V. Dennis, Fort Devens, Mass., assignors to Standard Brands Incorporated, New York, N.Y., a corporation of Delaware
No Drawing. Filed Jan. 4, 1965, Ser. No. 423,374
7 Claims. (Cl. 195—31)

ABSTRACT OF THE DISCLOSURE

A mixture of starch, water, and bacterial alpha amylase is charged into the bottom of a vertical reactor column in order to provide an advancing column of the mixture. The mixture is heated to the conversion temperature under superatmospheric backpressure until the desired reduction in the viscosity is achieved while keeping the column in motion in order to maintain the mixture in a fluid state throughout the column. The mixture is then heated to a temperature of 225–350° F. by introducing steam into the mixture in order to inactivate the alpha amylase.

---

This invention relates to a process for continuously converting starch by bacterial alpha amylase. The products produced by this process have great utility in the paper-making industry especially in paper coating and sizing compositions.

Starch is commonly purchased as raw starch and is converted in a batch process by the user in his plant. After conversion the starch paste may be stored for long periods before it is utilized in paper sizing and coating compositions. It has been an objective of the industry to provide a continuous starch conversion process but to our knowledge no practical continuous process has been devised. This objective is achieved by our process.

Starch pastes have the property of becoming increasingly more fluid as force is applied to cause motion in the mass. Kerr states in Chemistry and Industry of Starch, page 613, that "Aqueous adhesives made with a corn starch base have a tendency to form thixotropic gels; that is, the adhesive will, upon standing, change from a hydrosol to a hydrogel, which upon agitation reverts to a hydrosol (becomes fluid again)." We take advantage of this phenomenon in our invention and maintain the mass of starch paste undergoing conversion in a fluid state throughout the conversion cycle.

To carry out this process we have designed a vertical reactor column that is equipped with both horizontal and vertical baffles and with a rotating shaft in the center. The shaft is loaded with flow-directing blades and turbines which impart an internal flow pattern in the column so that the mass has a forward turbulent flow with the minimum of back-mixing. A positive displacement pump forces the slurry into the column and gives the forward flow.

In our process we prepare a starch-water-enzyme mixture or starch-water-pigment-enzyme mixture, pump this mixture into the bottom of the column with a positive displacement pump, and heat this mixture with steam at the bottom of the column to the optimum temperature for enzyme activity. This temperature is above the gel point of the starch. The time required to heat the mixture to the reaction temperature is in the range of 1–5 seconds. The turbines rotating on the shaft maintain the cooked starch mixture in a fluid state while the enzyme randomly depolymerizes the starch to continuously shorten the molecule. At the first stage of the column, the mixture is very thick and large flow-directing blades are required to maintain it in the fluid state. As the enzyme depolymerizes the starch, the viscosity is reduced and therefore less mixing is needed to maintain the fluid state. The mixing is reduced by changing the design of the flow-directing blades. After the mixture has passed through the column and has been liquefied to the desired degree steam is introduced to heat it to a temperature that will inhibit further activity by the enzyme. This temperature ranges from 225° F. to 350° F. After inactivation, the pressure on the converted starch is reduced to atmospheric pressure and it is ready for further processing for application to the paper. The column is operated under about 25–100 pounds back pressure.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

EXAMPLE 1

A starch slurry having a pH of 6.55 was prepared from 422 pounds of water, 178 pounds dry basis raw corn starch and 85 grams of an alpha amylase enzyme preparation from *B. subtilis* having a potency of 7,000 bacterial amylase units per gram. This slurry was introduced at the bottom of the reactor column described above together with enough steam to maintain the reaction mixture at 175° F. The back pressure on the column of liquid was 37 p.s.i.g. The reaction time was 6.7 minutes. The enzyme was inactivated at 275° F. and a product was obtained having 26.6% solids. The viscosity of the converted paste varied depending on the speed of revolution of the rotor shaft as indicated in the following table.

| Revolutions per minute: | Brookfield viscosity cps. @110° F., 50 r.p.m. |
|---|---|
| 2300 | 2312 |
| 2100 | 1748 |
| 1900 | 2004 |
| 1600 | 7060 |

EXAMPLE 2

A starch slurry having a pH of 7.5 was prepared from 359 pounds of water, 147 grams of tetrasodium pyrophosphate, 3 pounds, 4 ounces of sodium silicate (41° Bé. at 68° F.), 500 pounds of clay, 85 pounds dry basis raw corn starch and 11.5 grams of an alpha amylase preparation from *B. subtilis* having a potency of 7,000 bacterial amylase units per gram. The slurry was introduced at the bottom of the aforesaid reactor column at a pressure of 32 p.s.i.g. with enough steam to maintain the reaction temperature at 170° F. The reaction time in the column was 15 minutes. The enzyme in the converted paste was inactivated at 275° F. and a product was obtained having 58.6% solids. The viscosity of the product varied depending upon the speed of rotation of the rotor shaft as indicated in the following table.

| Revolutions per minute: | Brookfield viscosity cps. @110° F., 20 r.p.m. |
|---|---|
| 2000 | 17,600 |
| 1800 | 15,600 |
| 1600 | 11,400 |
| 1400 | 18,800 |

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A continuous process of converting starch which comprises heating a mixture of starch, water and bacterial alpha amylase to conversion temperature, holding an advancing column of the mixture at the conversion temperature under superatmospheric backpressure and with beating agitation until the desired reduction in the viscosity of the mixture is obtained while keeping the column in constant motion sufficient to maintain the mixture in a fluid state throughout the column and then heating to a temperature of 225°–350° F. by introducing steam into the mixture for a time sufficient to inactivate the enzyme, said agitation being controlled according to the degree of conversion of the starch, the more vigorous agitation being supplied at the beginning of the conversion.

2. Process as defined in claim 1 wherein the starch mixture also contains a clay.

3. Process as defined in claim 1, wherein the mixture is charged into the bottom of a vertical reactor column having a rotating shaft located therein which is connected to a rotating means and attached to the shaft are flow-directing blades and turbines that agitate the mixture and imparts thereto an upward turbulent flow.

4. Process as defined in claim 3, wherein the vertical reactor column has placed therein both horizontal and vertical baffles to provide further turbulent flow and to prevent a substantial degree of backmixing of the mixture in the column.

5. Process as defined in claim 4, wherein the flow-directional blades are disposed on the shaft such that the mixture is agitated more vigorously in the bottom portion of the reactor than at the top portion thereof.

6. Process as defined in claim 1 wherein the mixture is under a backpressure of 25 to 100 pounds during the conversion.

7. Process as defined in claim 6 wherein the mixture is heated to the conversion temperature in about 1 to about 5 seconds.

References Cited

UNITED STATES PATENTS

| | | | |
|---|---|---|---|
| 2,148,016 | 2/1939 | Gale | 195—17 X |
| 3,039,936 | 6/1962 | Lenney et al. | 195—11 |
| 2,609,326 | 9/1952 | Pigman et al. | 195—31 |
| 3,063,854 | 11/1962 | Claxton | 106—213 |
| 3,066,035 | 11/1962 | Albert | 106—211 |
| 3,081,184 | 3/1963 | Mosher et al. | 106—213 |

LIONEL M. SHAPIRO, *Primary Examiner.*

A. LOUIS MONACELL, *Examiner.*